US008699079B2

(12) United States Patent
Ono

(10) Patent No.: US 8,699,079 B2
(45) Date of Patent: Apr. 15, 2014

(54) IMAGE FORMING APPARATUS HAVING PAPER DUST REMOVAL DEVICE

(75) Inventor: Kazuaki Ono, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 13/164,051

(22) Filed: Jun. 20, 2011

(65) Prior Publication Data

US 2011/0317184 A1 Dec. 29, 2011

(30) Foreign Application Priority Data

Jun. 28, 2010 (JP) ................................. 2010-146194

(51) Int. Cl.
*G06K 1/00* (2006.01)

(52) U.S. Cl.
USPC ............ 358/1.9; 358/1.1; 358/1.15; 358/474; 399/358; 399/350

(58) Field of Classification Search
None
See application file for complete search history.

(56) References Cited

U.S. PATENT DOCUMENTS

| | | | | |
|---|---|---|---|---|
| 5,438,398 | A | 8/1995 | Tanigawa et al. | |
| 5,519,475 | A | 5/1996 | Miyamoto et al. | |
| 5,682,576 | A | 10/1997 | Sakai et al. | |
| 5,940,668 | A | 8/1999 | Tanigawa et al. | |
| 6,505,019 | B2 * | 1/2003 | Sato et al. | 399/98 |
| 6,577,842 | B2 * | 6/2003 | Akiba et al. | 399/359 |
| 6,614,004 | B2 | 9/2003 | Moriya et al. | |
| 7,016,638 | B2 | 3/2006 | Ono et al. | |
| 7,020,423 | B2 | 3/2006 | Ono et al. | |
| 7,343,109 | B2 | 3/2008 | Nishimura | |
| 8,041,239 | B2 * | 10/2011 | Nagata | 399/45 |
| 2005/0074249 | A1 * | 4/2005 | Nishimura | 399/55 |
| 2007/0104500 | A1 * | 5/2007 | Nagata | 399/45 |

FOREIGN PATENT DOCUMENTS

| | | | |
|---|---|---|---|
| CN | 1963684 | A | 5/2007 |
| CN | 100461017 | C | 2/2009 |
| JP | 2000-335762 | | 12/2000 |
| JP | 2005-114754 | A | 4/2005 |
| JP | 2007-127983 | A | 5/2007 |

OTHER PUBLICATIONS

Notification of the First Office Action dated Jul. 3, 2013, in Chinese Application No. 201110169890.5.

* cited by examiner

*Primary Examiner* — Steven Kau
(74) *Attorney, Agent, or Firm* — Fitzpatrick, Cella, Harper & Scinto

(57) ABSTRACT

An image forming apparatus is provided which realizes an adequate operation of a paper dust removing device. The image forming apparatus has a storing portion which stores the likelihood that paper dust is produced upon previous image formation as previous paper dust production information according to the type of sheet. Further, the image forming apparatus has a CPU which adjusts paper dust removing performance upon current image formation to increase based on previous paper dust production information when the likelihood that paper dust is produced upon previous image formation is higher. Consequently, it is possible to realize an adequate paper dust removing operation of the paper dust removing device and prevent problems of images from occurring due to paper dust.

4 Claims, 4 Drawing Sheets

IMAGE FORMING APPARATUS HAVING PAPER DUST REMOVAL DEVICE

BACKGROUND OF THE INVENTION

1. Field of the Invention

The present invention relates to an image forming apparatus such as a copying machine, a facsimile, a printer and an all-in-one machine having a paper dust removing device which removes adhered materials such as paper dust (sheet dust) on sheets.

2. Description of the Related Art

Generally, an image forming apparatus such as a copying machine, a facsimile, a printer and an all-in-one machine uses various sheets such as plain paper, recycled paper, OHP resin sheets and coated paper, and is demanded to form high quality images on these various sheets.

Here, when plain paper is fed, paper dust (sheet dust) is produced from the surface and end portion of plain paper, and therefore paper dust removing devices of various systems are conventionally arranged in image forming apparatuses to remove paper dust on sheets. However, to remove paper dust on the sheets, when, for example, an adhesive member is used for the paper dust removing device, there is a problem that running cost increases for an exchange of the adhesive member due to a decrease of an adhesive force. Further, a paper dust removing device which uses a positive/negative charging brush, positive/negative charging roller, ultrasonic wave, air sucking, and air blowing causes problems of increased power consumption and increased noise.

Hence, a paper dust removing device is proposed which solves the above various problems as much as possible by varying paper dust removing performance of the paper dust removing device according to sheets and enabling adjustment of paper dust removing performance.

The paper dust removing device in Japanese Patent Laid-Open No. 2000-335762 has the paper dust removing member which faces a sheet conveying path and the paper dust removing power source which applies a bias voltage to the paper dust removing member. By applying bias voltages of a charge polarity and opposite-polarity of paper dust to the paper dust removing member, it is possible to electrostatically attract paper dust of sheets to the paper dust removing member and remove paper dust. By increasing the absolute value of the bias voltage to be applied to this paper dust removing member, it is possible to increase an electrostatic attracting force and improve paper dust removing performance.

Further, a control device can adjust paper dust removing performance of the paper dust removing device based on the sheet state determined by a determination device. For example, when the determination device determines that sheets are coarse paper, the paper dust removing performance is increased by increasing the absolute value of the bias voltage. By contrast with this, when sheets are coated paper or OHP resin sheets of comparatively less paper dust, the paper dust removing performance may be decreased by decreasing the absolute value of the bias voltage, or set to off by turning off the bias voltage.

By this means, it is possible to prevent sheets from being unnecessarily charged, prevent power consumption from increasing and suppress image noise produced when sheets are unnecessarily charged.

Thus, by adjusting paper dust removing performance according to sheets, it is possible to reduce the frequency of exchanges, power consumption or noise of a paper dust removing member of the adhesive member.

However, the technique discusses in Japanese Patent Laid-Open No. 2000-335762 causes the following problem. For sheets (coarse paper in Japanese Patent Laid-Open No. 2000-335762) such as recycled paper which are likely to produce paper dust, the absolute value of the bias voltage is increased and paper is fed by maximizing the paper dust removing performance, and then, for the sheets (for example, coated paper or OHP resin sheets) which are not likely to produce paper dust, the bias voltage is turned off. However, when paper is fed by turning off the bias voltage in this way and minimizing paper dust removing performance, there are problems that images on coated paper and OHP resin sheets cause image deterioration (image defect) such as white dots and splattering due to paper dust.

This is because paper dust adheres to a sheet conveying path after recycled paper which produces many paper dust is fed. Then, paper dust adhered to the sheet conveying path is transferred onto coated paper or OHP resin sheets. This is because, with coated paper or OHP resin sheets, the bias voltage is turned off and paper dust removing performance is minimized, and therefore paper dust transferred onto coated paper or OHP resin sheets from the sheet conveying path cannot be removed, thereby causing white dots and image splattering.

That is, when, for example, an operator who is going to form images start printing (image formation), if low quality sheets which produce a great mount of paper dust are used upon printing (upon last before) before (immediately before) current printing, paper dust produced upon the last printing is left on the conveying path. Then, a problem is caused that paper dust adheres to the sheets which are conveyed upon subsequent printing, thereby causing image deterioration such as white dots and splattering.

It is therefore an object of the present invention to provide an image forming apparatus which realizes an adequate operation of a paper dust removing device by adjusting paper dust removing performance taking the influence of paper dust produced upon previous (last) image formation with respect to sheets used upon current image formation, and which does not deteriorate images due to paper dust.

SUMMARY OF THE INVENTION

An image forming apparatus according to the present invention includes an image forming portion which forms an image on a sheet, and a paper dust removing device which is arranged on a sheet conveying path on an upstream of the image forming portion, and which can adjust paper dust removing performance of removing paper dust on the sheet, wherein the image forming apparatus includes a storing portion which stores a likelihood that the paper dust is produced upon previous image formation as previous paper dust production information according to a type of a sheet, and a controlling portion which adjusts the paper dust removing performance upon current image formation, based on the previous paper dust production information stored in the storing portion.

According to the present invention, by adjusting paper dust removing performance upon current image formation to increase based on previous paper dust production information when the likelihood that paper dust upon previous image formation is produced is higher, a paper dust removing device can realize an adequate paper dust removing operation. Consequently, it is possible to form high quality images without image deterioration such as white dots and splattering due to paper dust on various sheets.

Further, upon current image formation, it is possible to decrease paper dust removing performance for types of sheets which are not likely to deteriorate images due to paper dust. Consequently, it is possible to remove paper dust with adequate paper dust removing performance without excessively or insufficiently performing paper dust removing performance, and, consequently, reduce the frequency of exchanges, power consumption or noise of a paper dust removing member.

Further features of the present invention will become apparent from the following description of exemplary embodiments with reference to the attached drawings.

DESCRIPTION OF THE EMBODIMENTS

<First Embodiment >

Figure 1:
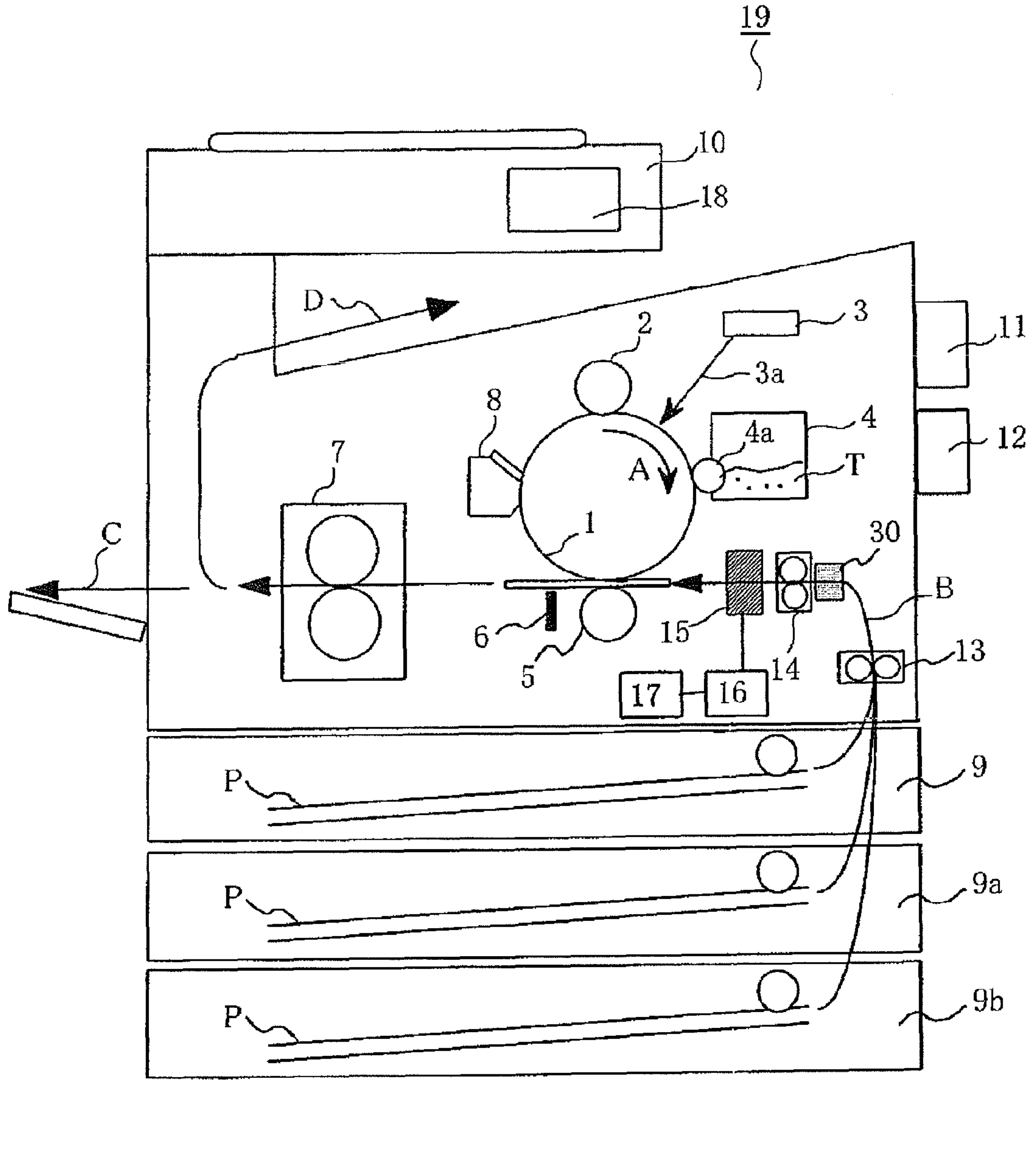
FIG. 1 is a schematic sectional view illustrating an example of an image forming apparatus according to the present invention.
Figure 2:
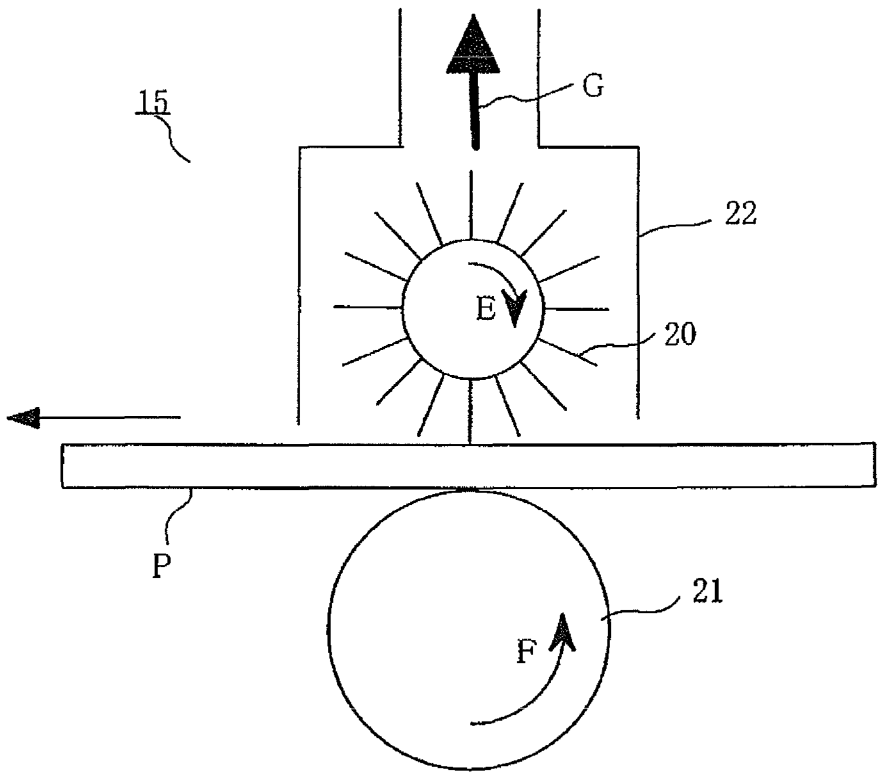
FIG. 2 is a schematic diagram illustrating an example of a paper dust removing device according to the present invention.
Figure 3:
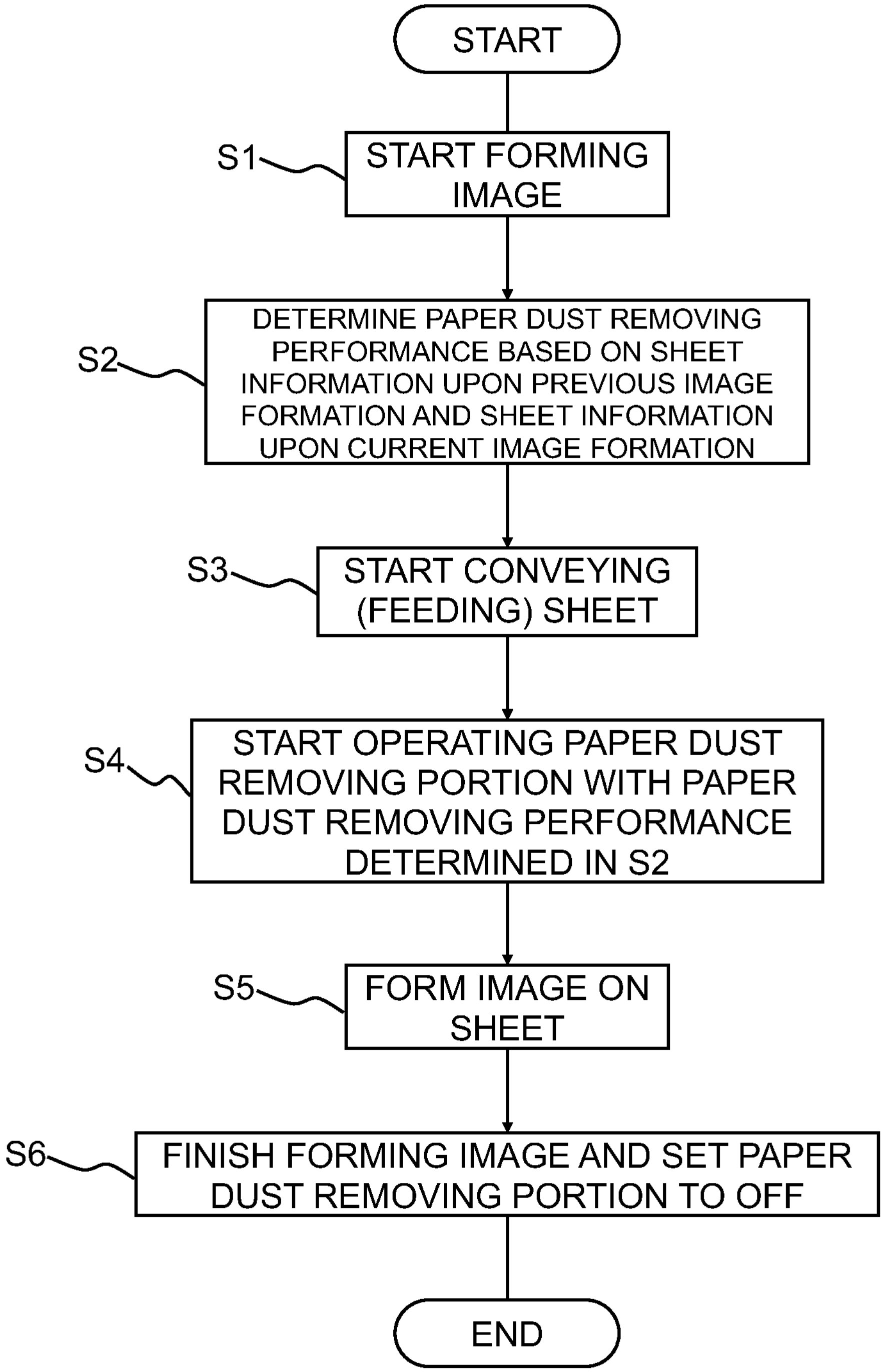
FIG. 3 is a flowchart illustrating an example of image formation which causes an operation of a paper dust removing device according to the present invention.

Hereinafter, an image forming apparatus of a first embodiment according to the present invention will be described with reference to FIGS. 1 to 3 and Tables 1 to 3. In addition, FIG. 1 is a schematic sectional view schematically illustrating the entire configuration of one example of the image forming apparatus such as an all-in-one machine, FIG. 2 is a schematic view illustrating an example of a paper dust removing device (sheet dust removing device) which removes paper dust (sheet dust), and FIG. 3 is a flowchart illustrating an example of image formation which causes the operation of the paper dust removing device. The same reference numerals will be assigned to the same members in these drawings, and overlapping description will not be repeated. Further, Table 1 illustrates an example of sheets which are likely to produce paper dust and which are not likely to produce paper dust, Table 2 illustrates an example of sheets which are likely to deteriorate images and which are not likely to deteriorate images, and Table 3 illustrates an example of paper dust removing performance determination processing.

First, an image forming apparatus 19 according to the present invention will be described in detail with reference to FIG. 1. As illustrated in FIG. 1, the image forming apparatus 19 has an image scanner which reads image information of document in the copying function, and forms images based on the image information from the image scanner 10, on sheets P sent out from the sheet cassettes 9, 9*a* and 9*b*. In the image scanner 10 provided in the body of the image forming apparatus 19, an operation portion 18 on which a copy button (not illustrated) and the like are arranged is disposed. This operation portion 18 is configured as an inputting portion which sets and inputs current sheet information for current image formation (sheet information upon current image formation).

The image forming apparatus 19 has a printer receiving portion 11 which receives print data created in an external device such as a personal computer (not illustrated), and a facsimile transmitting/receiving portion 12 which receives facsimile data transmitted through a communication line (not illustrated). Further, the image forming apparatus 19 has a paper dust removing device (sheet dust removing device) 15 which can adjust paper dust removing performance of removing paper dust on sheets, a CPU 16 of a controlling portion and a storing portion 17.

The storing portion 17 stores the likelihood (degree) that paper dust is produced upon previous image formation as previous paper dust production information (previous sheet dust production information and sheet information upon previous image formation) according to the type of sheet. The storing portion 17 further stores current sheet information related to the type of sheet upon current image formation after previous image formation. When receiving an input of current sheet information from the operation portion 18 upon image formation immediately after current image formation, the storing portion 17 updates current sheet information stored in advance in the storing portion 17 as previous paper dust production information.

Based on previous paper dust production information (previous sheet dust production information) stored in the storing portion 17, the CPU can adjust paper dust removing performance to increase when the likelihood (degree) that the paper dust is produced upon previous image formation is higher. Based on the previous paper dust production information and current sheet information stored in the storing portion 17, the CPU 16 according to the present embodiment has a function of adjusting paper dust removing performance upon current image formation. That is, referring to the previous paper dust production information and current sheet information stored in the storing portion 17, this CPU 16 adjusts paper dust removing performance upon current image formation according to the likelihood that paper dust is produced upon previous image formation and the influence with respect to current image formation.

The image forming apparatus 19 receives print data through the communication line (not illustrated) in the printer function, and forms images based on image information from print data, on the sheets P. Further, the image forming apparatus 19 receives facsimile data through the communication line (not illustrated) in the facsimile function, and forms images based on image information from facsimile data, on the sheets P.

Next, image formation in the image forming apparatus 19 will be described. As illustrated in FIG. 1, in the image forming apparatus 19, the photosensitive drum 1 rotates in an arrow A direction and the surface of the photosensitive drum 1 is charged negatively (for example, charged potential: −400 V) uniformly and evenly by the charging device 2 such as a charging roller. Further, when an exposure device 3 irradiates the surface of the photosensitive drum 1 with, for example, laser light 3*a* matching image information, an electrostatic latent image is formed on the photosensitive drum 1 (for example, exposure portion potential: −50 V).

For the electrostatic latent image on the photosensitive drum 1, a development sleeve 4*a* which rotates by being applied a bias of a development device (for example, DC: −250 V and AC: 1 k Vpp/2.5 kHz) develops negatively charged toner T. By this means, a toner T image is formed in the portion on the photosensitive drum 1 which is irradiated with laser light. The toner T image on the photosensitive drum 1 is electrostatically transferred onto the sheet P sent out from one of the sheet cassettes 9, 9*a* and 9*b* by a positive voltage (for example, DC: +2 kV) applied to a transfer device 5 such as a transfer roller. This sheet P passes a sheet conveying path B by a pair of conveying rollers 13, keeps its timing at a pair of registration rollers 14, and then is conveyed to the transfer device 5. In addition, the photosensitive drum 1, charging device 2, development device 4 and transfer device 5 form an image forming portion which forms images on the sheets P. The above sheet conveying path B is arranged on an upstream of this image forming portion and is provided to convey the sheets P to the image forming portion.

Then, the sheet P which bears the toner T image is separated from the photosensitive drum 1 by diselectrifying the positive electric charge of the sheet P by the negative voltage (for example, DC: −1 kV) applied to a separation device (for example, charge removal needle) 6. Then, the sheet P which bears the toner T image is conveyed to a fixing device 7, and heated and pressured, so that the toner T image is fixed on the sheet P. The sheet P after the fixing process is finished is discharged by selecting face-up discharge of the path C or face-down discharge on the path D.

By contrast with this, after a cleaning device 8 removes remaining transfer toner on the photosensitive drum 1, the photosensitive drum 1 which has finished the transfer process is uniformly and evenly charged by the charging device 2 again to prepare for the following image formation.

Next, a paper dust removing device 15 which removes paper dust on sheets arranged on the sheet conveying path B will be described.

When an image is formed in the state where large paper dust is adhered on the sheet P, if large paper dust is peeled off from the sheet P after the image is formed, an image defect occurs that the images corresponding to the paper dust lack, thereby producing white dots. By contrast with this, when an image is formed in a state where small paper dust is adhered to the sheet P, if the small paper dust is peeled off from the sheet P after the image is formed, the image lacking portion is small and is not a problem. However, in this case, images around dust are splattered due to small paper dust, and there is a problem that the images around paper dust become deep. This problem occurs when the sheet P and photosensitive drum 1 do not closely contact in portions around small paper dust, thereby generating a gap in the process of transferring toner T from the photosensitive drum 1 to the sheet P in the transfer device 5, and the toner T is transferred onto the sheet P in the gap while being splattered and transferred.

This paper dust removing device 15 removes paper dust on the sheet P to prevent these white dots and image splattering. Paper dust transferred from the sheet P and adhered to the sheet conveying path B, a pair of conveying rollers 13 and a pair of registration rollers 14 is transferred again and adhered to sheets on which images are subsequently formed, and therefore the paper dust removing device 15 is arranged in a portion immediately before the transfer device 5 (immediately before the transfer process).

Various systems can be adopted for the paper dust removing device 15. For example, there are a system of removing paper dust by having an adhesive roller, positive/negative charging brush or positive/negative charging roller contact the sheet P, a system of electrostatically removing paper dust without contacting the sheet P and a system of removing paper dust by floating paper dust by means of ultrasonic waves, and blowing air to or sucking the paper dust.

Hereinafter, the paper dust removing device according to the present embodiment will be described in detail with reference to FIG. 2. The paper dust removing device 15 has a backup roller 21 which is arranged in a portion facing the back surface (lower surface in FIG. 2) of the sheet P and rotates in an arrow F direction, and a brush roller 20 which is arranged in a portion facing the surface side of the sheet P on which the image is formed and rotates in an arrow E direction.

Paper dust on the sheet P is scraped by the brush roller 20. Paper dust floating from the sheet and paper dust adhered to the brush roller 20 are accumulated in a paper dust pack (not illustrated) by a duct 22 which performs air sucking of paper dust in an arrow G direction using an air sucking device (not illustrated). Thus, the paper dust removing device 15 employs the same configuration as a cleaner.

The paper dust removing device 15 has paper dust removing performance of four levels including high, middle, low and off, and is variably adjusted (automatically switched) when the CPU 16 in FIG. 1 controls the rotation speed and the amount of air sucking wind of the brush roller 20 at the four levels of high, middle, low and off. Further, the paper dust removing device 15 adopts a structure in which, when the paper dust removing performance is set to off, the brush roller 20 retracts to be in non-contact with the sheet P.

Incidentally, paper dust removing performance of the paper dust removing device 15 can be activated at "high" at all times in order only to remove paper dust. However, in this case, problems are likely to occur such as a noise problem that a motor sound becomes large at all times due to air sucking and a problem of a short longevity that the elastic brush roller 20 plastically deforms and paper dust removing performance decreases at an early stage.

Hereinafter, the relationship between paper dust and the sheet P will be described. That is, sheets which are likely to produce paper dust include common "paper" such as high quality paper, plain paper and recycled paper and there are various types of sheets, and therefore the amount of paper dust is various. Although the amount of paper dust of recycled paper is great, some plain paper produces more paper dust than recycled paper. By contrast with this, with sheets which are not likely to produce paper dust, materials other than "paper" are used for the sheet surface such as double-side coated paper provided with coating layers based on high quality paper, and OHP resin sheets.

Hereinafter, sheets which are likely to produce paper dust and sheets which are not likely to produce paper dust will be listed in Table 1.

TABLE 1

Examples of sheets which are likely to produce paper dust and which are not likely to produce paper dust

| Sheets which are likely to produce paper dust | Sheets which are not likely to produce paper dust |
|---|---|
| High quality paper, plain paper, recycled paper, envelope, postcard, label paper, embossed paper, bond paper, single-side coated paper (for example, gloss coated paper, matt coated paper and silk coated paper) | Double-side coated paper (for example, gloss coated paper, matt coated paper, and silk coated paper), OHP resin sheet, vellum paper, and mother print sheet |

Although the double-side coated paper on both sheet surfaces of which coating layers are provided are classified as sheets which are not likely to produce paper dust among coated paper in Table 1, single-side coated paper on a single sheet surface of which a coating layer is provided is classified as sheets which are likely to produce paper dust because common "paper" is used on one side.

Further, sheets which significantly influence images due to paper dust, that is, sheets which are likely to deteriorate images due to paper dust on sheets have smoother surfaces such as gloss coated paper and OHP resin sheets having smoother sheet surfaces than common "paper". Further, thick (large basis weight) gloss coated paper in particular is likely to deteriorate images due to paper dust.

By contrast with this, sheets which little influence images due to paper dust, that is, sheets which are not likely to deteriorate images due to paper dust on sheets, are common "paper" having coarse sheet surfaces and convexities and concavities, and are plain paper and recycled paper having poor smooth surfaces among "paper". Further, coated paper such as matt coated paper and silk coated paper having coarse surfaces and significant concavities and convexities are not also likely to deteriorate images due to paper dust on sheets. This is because, when there is small paper dust on sheets, the difference of image splattering levels is significant between the closely-contacting portion of the photosensitive drum 1 and sheet P and the gap portions around small paper dust in sheets having smooth surfaces, and therefore image splattering around small paper dust is more distinctive.

By contrast with this, the difference of image splattering levels is insignificant between the closely-contacting portion between the photosensitive drum 1 and sheet P and the gap portions around small paper dust in sheets having coarse surfaces and significant concavities and convexities, and therefore image splattering around small paper dust is less distinctive. Further, smooth and thick (large basis weight) sheets in particular have high rigidity and a large and wide gap around paper dust, and therefore images are significantly splattered around paper dust.

Hereinafter, sheets which are likely to deteriorate images due to paper dust and sheets which are not likely to deteriorate images due to paper dust will be listed in Table 2.

TABLE 2

Examples of sheets which are likely to deteriorate images due to paper dust and which are not likely to deteriorate images due to paper dust

| Sheets which are likely to deteriorate images due to paper dust | Sheets which are not likely to deteriorate images due to paper dust |
|---|---|
| Gloss coated paper, matt coated paper (*1), silk coated paper (*1) and OHP resin sheet | Matt coated paper (*1), silk coated paper (*1), high quality paper, plain paper, recycled paper, envelope, postcard, label paper, embossed paper, bond paper, vellum paper and mother print sheet |

(*1): Matt coated paper and silk coated paper have various surface properties (concave-convex level and smoothness), and therefore are classified into both categories depending on sheets.

Regarding image deterioration due to paper dust, it has been described that, when paper dust is large, image deterioration occurs that images lack, thereby producing white dots and, when paper dust is small, image splattering around paper dust occurs.

Although large paper dust has a small adhering force to sheets and therefore is easily removed from sheets by the paper dust removing device 15, small paper dust has a great adhering force to sheets and therefore is difficult to remove from sheets by the paper dust removing device 15. Therefore, although most of large paper dust which cause an image defect of white dots are removed even if performance of the paper dust removing device 15 is low, small paper dust is difficult to remove and performance of the paper dust removing device 15 needs to be increased. Hence, there is particularly a problem of image splattering around paper dust due to small paper dust.

Next, the influence of paper dust on sheets when a previous image is formed (upon previous image formation) will be described. That is, after sheets which are likely to produce paper dust such as a great amount of plain paper is fed, when sheets which significantly influence images due to paper dust such as double-side gloss coated paper are fed, although the double-side gloss coated paper is not likely to produce paper dust, it is found that image splattering is likely to occur due to paper dust.

This is because, when plain paper which is likely to produce paper dust are fed, if double-side gloss coated paper which is not likely to produce paper dust is fed after paper dust is adhered to the sheet conveying path B and a pair of conveying rollers 13, paper dust is transferred and adhered to double-side gloss coated paper from the sheet conveying path B.

Therefore, conventionally, after sheets (for example, recycled paper) which are likely to produce paper dust are fed by maximizing performance of the paper dust removing device, if sheets (for example, double-side gloss coated paper) which are not likely to produce paper dust are fed by minimizing or setting performance of the paper dust removing device to off, the following problem occurs. That is, the problem is that fine paper dust adhered to the sheet conveying path is transferred onto the surface of double-side gloss coated paper and images of the double-side gloss coated paper are splattered.

Therefore, it is found that, even in case of sheets which are not likely to produce paper dust but significantly influence images due to paper dust, it is found that there are cases where performance of the paper dust removing device 15 needs to be increased.

The storing portion 17 arranged in the image forming apparatus 19 stores (contains) previous paper dust production information which is sheet information upon previous image formation, and stores current sheet information which is sheet information upon current image formation (upon current image formation).

The CPU 16 of the controlling portion performs paper dust removing performance determination processing of determining paper dust removing performance referring to the previous paper dust production information and current sheet information stored in the storing portion 17. That is, the CPU 16 determines the previous paper dust production information and current sheet information related to the sheet P which is conveyed to the image forming portion to form an image thereon, referring to the information stored in the storing portion 17. Further, the CPU 16 performs control to adjust the paper dust removing performance of the paper dust removing device 15 for current image formation, based on previous paper dust production information upon previous (last) image formation and current sheet information upon current image formation.

Next, the function according to the present embodiment will be described with reference to the flowchart of FIG. 3.

First, in step S1, image formation is started. Then, the CPU 16 determines paper dust removing performance of the paper dust removing device 15 for current image formation, based on the previous paper dust production information set and input from the operation portion 18 upon previous image formation and current sheet information input from the operation portion 18 for image formation to be performed (S2).

In step S2, the CPU 16 performs processing of determining paper dust removing performance according to, for example, Table 3 referring to the previous paper dust production information (sheet information upon previous image formation)

and current sheet information (sheet information upon current image formation) stored in the storing portion 17.

TABLE 3

| Paper dust removing performance determination processing in S2 | | | |
|---|---|---|---|
| | Amount of produced paper dust of sheet upon previous image formation | Influence on images on sheet upon current image formation | Paper dust removing performance |
| (1) | Great | Great | High |
| (2) | Great | Small | Low |
| (3) | Small | Great | Middle |
| (4) | Small | Small | OFF |

Hereinafter, paper dust removing performance determination processing in step S2 in Table 3 will be described. For example, in case of (1) where sheets upon previous image formation are plain paper (the amount of produced paper dust: great) based on previous paper dust production information and sheets upon current image formation are gloss coated paper (the influence on images: great) based on current sheet information, it is determined as follows. That is, it is determined that the great amount of paper dust adheres to the sheet conveying path B, a pair of conveying rollers 13 and a pair of registration rollers due to plain paper upon previous image formation, and gloss coated paper upon current image formation is likely to deteriorate images due to paper dust. Hence, in this case, by adjusting and switching paper dust removing performance to "high" and removing large paper dust and small paper dust on gloss coated paper, the CPU 16 reduces image deterioration such as white dots and image splattering due to paper dust on gloss coated paper upon current image formation.

Further, in case of (2) in Table 3 where sheets upon previous image formation are plain paper (the amount of produced paper dust: great) and sheets upon current image formation are plain paper (the influence on images: small), it is determined as follows. That is, even when a great amount of paper dust adheres to the sheet conveying path B due to plain paper upon previous image formation, plain paper upon current image formation is not likely to splatter images due to small paper dust. Hence, in this case, by adjusting and switching paper dust removing performance to "low" and mainly removing large paper dust on plain paper, the CPU 16 reduces image deterioration such as white dots and image splattering due to paper dust on plain paper upon current image formation.

In case of (3) in Table 3 where sheets upon previous image formation are OHP resin sheets (the amount of produced paper dust: small) and sheets upon current image formation are gloss coated paper (the influence on images: great), it is determined as follows. That is, paper dust does not adhere to the sheet conveying path B due to the OHP resin sheets upon previous image formation, and therefore, although paper dust is little, gloss coated paper upon current image formation is likely to deteriorate images due to paper dust. Hence, in this case, by switching paper dust removing performance to "middle" and removing large paper dust and small paper dust on gloss coated paper, the CPU 16 reduces image deterioration such as white dots and image splattering due to paper dust on gloss coated paper upon current image formation.

Further, in case of (4) in Table 3 where sheets upon previous image formation are OHP resin sheets (the amount of produced paper dust: small) and sheets upon current image formation are plain paper (the influence on image: small), it is determined as follows. That is, paper dust does not adhere to the sheet conveying path B due to the OHP resin sheets upon previous image formation, and therefore paper dust is little and plain paper upon current image formation is not likely to splatter images due to small paper dust. Consequently, even when paper dust removing performance is set to off, plain paper upon current image formation is substantially little likely to cause image deterioration such as white dots and image splattering due to paper dust, and does not cause a problem in a practical use.

When the type of current sheet (current sheet information) is input from the operation portion 18 to the image forming apparatus 19, the CPU 16 determines whether sheets are likely to produce paper dust and significantly influence images due to paper dust. For example, sheets which are likely to produce paper dust include plain paper, sheets which are not likely to produce paper dust include OHP resin sheets, sheets which significantly influence images due to paper dust include gloss coated paper, and sheets which little influence images due to paper dust include the type of sheet such as plain paper. These types of sheets are set in advance by the operator using the operation portion 18 for each one of the sheet cassettes 9, 9*a* and 9*b* in FIG. 1.

More specifically, the sheet type buttons such as "plain paper", "OHP sheet" and "gloss coated paper" are selected on the screen of the operation portion 18 for each one of the sheet cassettes 9, 9*a* and 9*b*, and input and set. Further, from which sheet cassette sheets upon previous image formation are fed and from which sheet cassette sheets upon current image formation are fed are stored in the storing portion 17, and the CPU 16 performs paper dust (sheet dust) removing performance determination processing based on these pieces of information.

After paper dust removing performance is determined in above step S2, the sheet P for current image formation starts being conveyed (fed) in step S3, and, in step S4, the operation of the paper dust removing device 15 is started with paper dust removing performance determined in step S2.

Further, in step S5, the image forming portion including the photosensitive drum 1, charging device 2, development device 4 and transfer device 5 form images on sheets. Then, in step S6, the paper dust removing device 15 is set to off at the same time when image formation is finished, and images without image deterioration due to paper dust on sheets are formed to finish image formation.

COMPARISON EXAMPLE 1

Compared to the configuration where paper dust removing performance is set to "high" for sheets which are likely to produce paper dust and paper dust removing performance is set to "low (or off)" for sheets which are not likely to produce paper dust, the following result is obtained according to the present embodiment. That is, according to the present embodiment, white dots and image splattering due to paper dust can be reduced on gloss coated paper or OHP resin sheets which are not likely to produce paper dust and which are likely to cause image deterioration due to paper dust.

COMPARISON EXAMPLE 2

Compared to the configuration where paper dust removing performance of the paper dust removing device 15 is set to "high" at all times, the following result is obtained according to the present embodiment. That is, according to the present embodiment, image deterioration due to paper dust is the same level and, by setting paper dust removing performance to low for plain paper which is frequently used, the brush roller 20 and air sucking motor are operated to rotate at a low speed. By this means, it is possible to reduce more noise, provide a longer-life of components of the paper dust removing device 15 such as the brush roller and save more energy of the paper dust removing device 15 and image forming apparatus 19.

As described above, by adjusting paper dust removing performance of the paper dust removing device upon current image formation to be performed, according to previous paper dust production information and current sheet information, it is possible to perform adequate paper dust removing processing. In addition, a configuration which can vary paper dust removing performance other than the configuration used in the present embodiment allows the paper dust removing device 15 to provide the same effect.

Further, the amount of produced paper dust and the influence on images according to the type of sheet can be randomly set according to the image forming apparatus. That is, although sheets which are likely to produce paper dust and sheets which are not likely to produce paper dust are illustrated in Table 1 and sheets which are likely to deteriorate images due to paper dust and sheets which are not likely to deteriorate images due to paper dust are illustrated in Table 2, the category of the type of sheet may be randomly set according to the image forming apparatus.

In addition, with the present embodiment, sheets which are likely to produce paper dust such as plain paper and sheets which significantly influence images due to paper dust are selected as "type of sheet" and classified, sheets may be classified by selecting "sheet name (name of paper)".

According to the classifying system based on the sheet name, the image forming apparatus can learn the sheet property (the likelihood that likely paper dust is produced and smoothness of the surface) in more detail compared to the classifying system based on the type of sheet, and provides an advantage of performing more adequate paper dust removing processing. However, the image forming apparatus needs to store an enormous amount of sheet names and property values associated with the sheet names.

Further, according to a sheet name inputting method, a sheet name is preferably selected from a sheet name list (media list) on the screen of the operation portion 18.

As described above, according to the present embodiment, when the likelihood that paper dust is produced upon previous image formation is higher, the CPU 16 can adjust paper dust removing performance upon current image formation to increase, based on previous paper dust production information. Consequently, it is possible to realize a more adequate paper dust removing operation of the paper dust removing device 15. Consequently, it is possible to provide high quality images without image deterioration such as white dots and splattering due to paper dust on various sheets while providing a longer-life of components of the paper dust removing device 15, saving more energy and reducing more noise.

Further, according to the present embodiment, the CPU 16 can adjust paper dust removing performance upon current image formation based on previous paper dust production information and current sheet information. That is, referring to previous paper dust production information and current sheet information, the CPU 16 can adjust paper dust removing performance upon current image formation according to the influence of the amount of produced paper dust upon previous image formation with respect to current image formation. Consequently, it is possible to realize a more adequate paper dust removing operation of the paper dust removing device 15. Further, it is possible to avoid problems of deterioration and a shorter-life of components of the paper dust removing device 15, an increase of consumption power and noise, and enhance a longer-life, save more energy and reduce more noise of the paper dust removing device 15. By this means, it is possible to provide high quality images without image deterioration such as white dots and splattering due to paper dust on various sheets.

<Second Embodiment>

Next, a second embodiment according to the present invention will be described with reference to FIGS. 1 to 3 and Table 4. In addition, Table 4 illustrates an example of paper dust removing performance determination processing according to the present embodiment.

It has been described with the above-described first embodiment that smooth sheets are likely to splatter images around small paper dust. Further, smooth and thick (large basis weight) sheets have high rigidity, a large gap around paper dust in transfer process and a wide gap, and therefore it is found that images are significantly splattered around small paper dust.

Hence, according to the present embodiment, with paper dust removing performance determination processing, the basis weight of sheets used upon current image formation is added in addition to the type of sheet of sheet information according to the first embodiment (previous paper dust production information and current sheet information) to segment and control paper dust removing performance.

To realize this, with the present embodiment, the storing portion 17 further stores the basis weight of sheets used upon current image formation as sheet basis weight information. Referring to the previous paper dust production information, current sheet information and sheet basis weight information stored in the storing portion 17, the CPU 16 adjusts paper dust removing performance upon current image formation according to the influence of the amount of produced paper dust upon previous image formation, with respect to current image formation.

Paper dust removing performance of the paper dust removing device 15 which has six levels of off and 1 to 5 (1: low paper dust removing performance and 5: high paper dust removing performance) and the rotation speed and the amount of air sucking wind of the brush roller 20 are each controlled by the CPU 16 and switched and adjusted at six levels of off and 1 to 5. Further, with the present embodiment, the paper dust removing device adopts a structure where, when the paper dust removing performance is set to off, the brush roller 20 retracts to be in non-contact with the sheet P.

With the present embodiment, paper dust removing performance is bifurcated at, for example, 105 $g/m^2$ of the basis weight according to the image splattering level around paper dust. Sheets equal to or less than 105 $g/m^2$ have a good image splattering level and therefore paper dust removing performance is decreased, and sheets equal to or more than 106 $g/m^2$ have a large image splattering level and therefore paper dust removing performance is increased.

With the present embodiment, although the flowchart of FIG. 3 referred to in the previous embodiment will be used in common, Table 4 will be used for paper dust removing performance determination processing in step S2.

TABLE 4

Paper dust removing performance determination processing in S2

| | Amount of produced paper dust of sheet upon previous image formation | Influence on images on sheet upon current image formation | Sheet basis weight upon current image formation | Paper dust removing performance |
|---|---|---|---|---|
| (1) | Great | Great | Equal to or more than 106 g/m$^2$ | 5 |
| (2) | Great | Great | Equal to or less than 105 g/m$^2$ | 4 |
| (3) | Great | Small | Equal to or more than 106 g/m$^2$ | 2 |
| (4) | Great | Small | Equal to or less than 105 g/m$^2$ | 1 |
| (5) | Small | Great | Equal to or more than 106 g/m$^2$ | 4 |
| (6) | Small | Great | Equal to or less than 105 g/m$^2$ | 3 |
| (7) | Small | Small | Equal to or more than 106 g/m$^2$ | 1 |
| (8) | Small | Small | Equal to or less than 105 g/m$^2$ | OFF |

Hereinafter, paper dust removing performance determination processing in step S2 will be described with reference to Table 4. That is, as illustrated in Table 4, the type of sheet and basis weight are used as sheet information upon current image formation in step S2.

For example, in case of (1) in Table 4 where sheets upon previous image formation are plain paper (the amount of produced paper dust: great), sheets upon current image formation are gloss coated paper (the influence on images: great) and the basis weight of gloss coated paper upon current image formation is equal to or more than 106 g/m$^2$, it is determined as follows. That is, a great amount of paper dust adheres to the sheet conveying path B due to plain paper upon previous image formation. By this means, the gloss coated paper upon current image formation is likely to deteriorate images due to small paper dust because of the type of sheet, and the basis weight of the gloss coated paper is great and therefore the image splattering level is high. Consequently, by setting paper dust removing performance to the maximum level “5” and removing large paper dust and small paper dust on gloss coated paper, it is possible to reduce image deterioration such as white dots and image splattering due to paper dust on the gloss coated paper upon current image formation.

Further, in case of (2) in Table 4 where sheets upon previous image formation are plain paper (the amount of produced paper dust: great), sheets upon current image formation are gloss coated paper (the influence on images: great) and the basis weight of gloss coated paper upon current image formation is equal to or more than 105 g/m$^2$, it is determined as follows. That is, a great amount of paper dust adheres to the sheet conveying path B due to plain paper upon previous image formation. By this means, although the gloss coated paper upon current image formation is likely to deteriorate images due to small paper dust because of the type of sheet, the basis weight of the gloss coated paper is small and therefore the image splattering level is slightly good. Consequently, by setting paper dust removing performance to “4” one level lower than the maximum level and removing large paper dust and small paper dust on gloss coated paper, it is possible to reduce image deterioration such as white dots and image splattering due to paper dust on the gloss coated paper upon current image formation.

In case of (3) in Table 4 where sheets upon previous image formation are plain paper (the amount of produced paper dust: great), sheets upon current image formation are plain paper (the influence on images: small) and the basis weight of plain paper upon current image formation is equal to or more than 106 g/m$^2$, it is determined as follows. That is, even when a great amount of paper dust adheres to the sheet conveying path B due to plain paper upon previous image formation, plain paper upon current image formation is not likely to splatter images due to small paper dust because of the type of sheet, and the basis weight of plain paper is great and therefore the image splattering level is slightly high. Consequently, by setting paper dust removing performance to “2” and mainly removing large paper dust on plain paper, it is possible to reduce image deterioration such as white dots and image splattering due to paper dust on the plain paper upon current image formation.

Further, in case of (4) in Table 4 where sheets upon previous image formation are plain paper (the amount of produced paper dust: great), sheets upon current image formation are plain paper (the influence on images: small) and the basis weight of plain paper upon current image formation is equal to or less than 105 g/m$^2$, it is determined as follows. That is, even when a great amount of paper dust adheres to the above sheet conveying path B due to plain paper upon previous image formation, plain paper upon current image formation is not likely to splatter images due to small paper dust because of the type of sheet, and the basis weight of plain paper is small and therefore the image splattering level is good. Consequently, by setting paper dust removing performance to “1” and mainly removing large paper dust on plain paper, it is possible to reduce image deterioration such as white dots and image splattering due to paper dust on the plain paper upon current image formation.

In case of (5) in Table 4 where sheets upon previous image formation are OHP resin sheets (the amount of produced paper dust: small), sheets upon current image formation are gloss coated paper (the influence on images: great) and the basis weight of gloss coated paper upon current image formation is equal to or more than 106 g/m$^2$, it is determined as follows. That is, paper dust does not adhere to the above sheet conveying path B due to the OHP resin sheets upon previous image formation. Therefore, although paper dust is little, gloss coated paper upon current image formation is likely to splatter images due to small paper dust because of the type of sheet, and the basis weight of the gloss coated paper is great and therefore the image splattering level is not good. Consequently, by setting paper dust removing performance to “4” and removing large paper dust and small paper dust on gloss coated paper, it is possible to reduce image deterioration such as white dots and image splattering due to paper dust on the gloss coated paper upon current image formation.

Further, in case of (6) in Table 4 where sheets upon previous image formation are OHP resin sheets (the amount of produced paper dust: small), sheets upon current image formation are gloss coated paper (the influence on images: great) and the basis weight of gloss coated paper upon current image formation is equal to or less than 105 g/m$^2$, it is determined as follows. That is, paper dust does not adhere to the sheet conveying path B, a pair of conveying rollers 13 and a pair of registration rollers due to OHP resin sheets upon previous image formation. By this means, although paper dust is little and the gloss coated paper upon current image formation is likely to splatter images due to small paper dust because of the type of sheet, the basis weight of the gloss coated paper is small and therefore the image splattering level is slightly good. Consequently, by setting paper dust removing performance to “3” and removing large paper dust and small paper dust on gloss coated paper, it is possible to reduce image deterioration such as white dots and image splattering due to paper dust on the gloss coated paper upon current image formation.

In case of (7) in Table 4 where sheets upon previous image formation are OHP resin sheets (the amount of produced paper dust: small), sheets upon current image formation are plain paper (the influence on images: small) and the basis weight of plain paper upon current image formation is equal to or more than 106 g/m$^2$, it is determined as follows. That is, paper dust does not adhere to the above sheet conveying path B due to the OHP resin sheets upon previous image formation. Hence, although paper dust is little and the plain paper upon current image formation is not likely to splatter images due to small paper dust because of the type of sheet, the basis weight of the plain paper is great and therefore the image splattering level is slightly high. Consequently, by setting paper dust removing performance to “1” and mainly removing large paper dust on plain paper, it is possible to reduce image deterioration such as white dots and image splattering due to paper dust on the plain paper upon current image formation.

In case of (8) in Table 4 where sheets upon previous image formation are OHP resin sheets (the amount of produced paper dust: small), sheets upon current image formation are plain paper (the influence on images: small) and the basis weight of plain paper upon current image formation is equal to or less than 105 g/m$^2$, it is determined as follows. That is, paper dust does not adhere to the above sheet conveying path B due to the OHP resin sheets upon previous image formation. Hence, although paper dust is little and the plain paper upon current image formation is not likely to splatter images due to small paper dust because of the type of sheet, the basis weight of the plain paper is great and therefore the image splattering level is good. Consequently, even when paper dust removing performance is set to “off”, plain paper upon current image formation is substantially little likely to cause image deterioration such as white dots and image splattering due to paper dust, and does not cause a problem in a practical use.

According to the present embodiment, the operation portion 18 of the inputting portion can set and input sheet basis weight information together with current sheet information (sheet information upon current image formation). For example, the type of sheet and basis weight of the following sheets are set and input in advance from the operation portion 18 for each of the sheet cassettes 9, 9*a* and 9*b* of FIG. 1. That is, sheets which are likely to produce paper dust include plain paper equal to or less than 105 g/m$^2$ and plain paper equal to or more than 106 g/m$^2$, and sheets which are not likely to produce paper dust include OHP resin sheets. Further, sheets which significantly influence images due to paper dust include gloss coated paper equal to or less than 105 g/m$^2$ and gloss coated paper equal to or more than 106 g/m$^2$. Sheets which little influence images due to paper dust include plain paper equal to or less than 105 g/m$^2$ and plain paper equal to or more than 106 g/m$^2$.

More specifically, buttons associated with the type of sheet and basis weight are selected on the screen of the operation portion 18 for each one of the sheet cassettes 9, 9*a* and 9*b*, and input and set. The types of sheets include “plain paper equal to or less than 105 g/m$^2$”, “plain paper equal to or more than 106 g/m$^2$”, “OHP resin sheet”, “gloss coated paper equal to or less than 105 g/m$^2$” and “gloss coated paper equal to or more than 106 g/m$^2$”.

Further, from which sheet cassette sheets upon previous image formation are fed and from which sheet cassette sheets upon current image formation are fed are stored in the storing portion 17, and the CPU 16 performs paper dust removing performance determination processing based on these pieces of information.

Although, with the above-described first embodiment, paper dust removing performance of the paper dust removing device 15 is varied according to the type of sheet (plain paper or coated paper) of the input sheet information, with the present embodiment, paper dust removing performance is varied based on sheet information further including the sheet basis weight. Referring to the previous paper dust production information, current sheet information and sheet basis weight information stored in the storing portion 17, the CPU 16 according to the present embodiment adjusts paper dust removing performance upon current image formation according to the influence of the amount of produced paper dust upon previous image formation, with respect to current image formation. By this means, it is possible to more accurately remove paper dust on sheets on which images are formed. Further, it is possible to provide higher quality images without image deterioration such as white dots and splattering due to paper dust on various sheets, and prevent problems of deterioration and a shorter-life of the paper dust removing device 15, an increase of power consumption and noise.

In addition, although the basis weight is bifurcated at 105 g/m$^2$ as an example with the present embodiment, if, for example, the thicknesses of plain paper and double-side coated paper having the same basis weight are significantly different (the rigidities are significantly different even if the basis weight is the same), the bifurcation value of the basis weight is more preferably varied according to the type of sheet.

Further, a configuration has been described with the present embodiment where the sheet basis weight is used for the rigidity of sheets in paper dust removing performance determination processing. However, for example, a configuration is possible where a sheet thickness detector (not illustrated) is provided in the image forming apparatus 19 to detect the sheet thickness and use the sheet thickness for the rigidity of sheets in paper dust removing performance determination processing.

<Third Embodiment>

Figure 4:
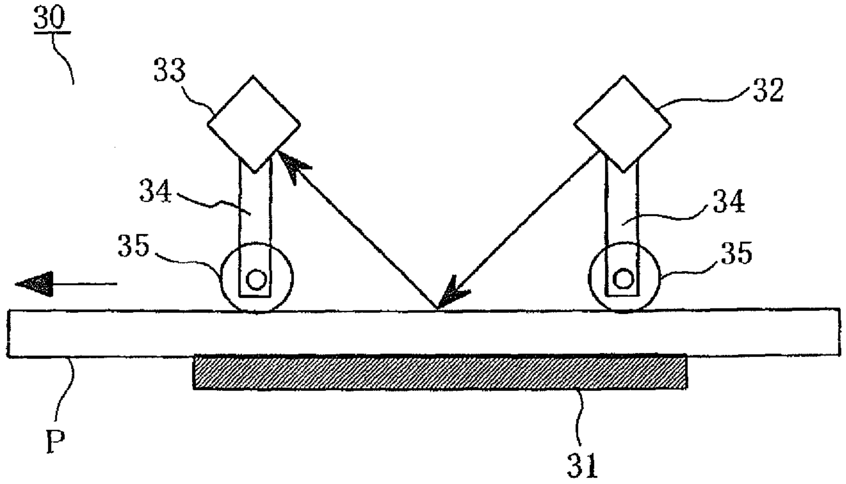
FIG. 4 is a schematic diagram illustrating an example of a sheet surface property detector of a third embodiment according to the present invention.

Next, a third embodiment according to the present invention will be described with reference to FIGS. 1, 2, 4 and Table 5. In addition, FIG. 4 illustrates a configuration example of a sheet surface property detector 30, and Table 5 illustrates another example of paper dust removing performance determination processing.

When the sheet surface is smoother, the influence on images due to paper dust is more significant, that is, image deterioration due to paper dust is more likely to occur, and therefore the influence on images due to paper dust have been determined using the type of sheet and basis weight as sheet information with the preceding first and second embodiments.

However, although almost all types of gloss coated paper are sheets which significantly influence images due to paper dust, for example, matt coated paper includes matt coated paper of various concave-convex levels.

Therefore, it is found that there are smooth matt coated paper having the same basis weight some of which are smooth and significantly influence images due to paper dust and some of which are significantly concave-convex (coarse) and little influence images due to paper dust.

Hence, with the present embodiment, the sheet surface property detector 30 (see FIG. 1) which measures smoothness of the sheet P is arranged in the image forming apparatus 19 to more accurately detect the influence due to paper dust of sheets by measuring smoothness of the sheet P and determining the influence due to paper dust.

To realize this, with the present embodiment, the sheet surface property detector 30 is provided which detects smoothness of sheets conveyed on the sheet conveying path B. Further, the storing portion 17 according to the present embodiment stores the sheet basis weight used upon current image formation as sheet basis weight information in addition to previous paper dust production information and current sheet information, and stores the detection result of sheet smoothness by the sheet surface property detector 30 as sheet smoothness information.

The CPU (controlling portion) 16 according to the present embodiment refers to the previous paper dust production information, current sheet information, sheet basis weight information and sheet smoothness information stored in the storing portion 17. Further, the CPU 16 adjusts paper dust removing performance of the paper dust removing device 15 upon current image formation according to the influence of the amount of produced paper dust upon previous image formation, with respect to current image formation.

As illustrated in FIG. 1, the sheet surface property detector 30 is arranged between a pair of registration rollers 14 and a pair of conveying rollers 13, that is, in the downstream of a pair of conveying rollers 13 on the sheet conveying path B and in the direct upstream portion of a pair of registration rollers 14. The sheet surface property detector 30 is arranged in the upstream portion of the paper dust removing device 15 in the sheet conveying direction as described above to detect smoothness of the surface of the sheet P conveyed on the sheet conveying path B and reflect the detection result in paper dust removing performance of the paper dust removing device 15. By arranging the sheet property detector 30 in this way, the paper dust removing device 15 is operated with more adequate paper dust removing performance, so that it is possible to prevent image deterioration due to paper dust and provide a longer-life of the paper dust removing device 15, save more energy and reduce more noise.

As illustrated in FIG. 4, the sheet surface property detector 30 includes a backup member 31 which holds the sheets P flat, and a light outputting element and a light inputting element 33 which are respectively supported by supporting members 34 and 34 extending in the up-down direction.

The backup member 31 is preferably coated black such that light transmitting through thin paper is not reflected on the backup member 31 when the sheet surface property detector 30 detects the surface property of thin paper. Further, when the distances between the light outputting element 32, light inputting element 33 and sheet P change, the received light intensity in the light inputting element 33 fluctuates and therefore accurate reflected light cannot be measured. Hence, to maintain the distances constant, rollers 35 are respectively provided in the lower portions of the supporting members 34 and 34.

The light outputting element 32 and light inputting element 33 supported by the supporting members 34 which have the rollers 35 rotate and contact the sheet P are configured to be elastically pressured at predetermined pressure in the sheet P direction, and maintain the distances constant even if the sheets P have various thicknesses.

The sheet surface property detector 30 may be configured to perform detection while the sheets P are conveyed or may be configured to perform detection when a pair of registration rollers 14 temporarily stop conveying the sheets P. However, when the conveying speed of the sheets P is very fast, the inclination of the output voltage with respect to smoothness becomes small, and therefore the sheet surface property detector 30 is preferably configured to perform measurement when the sheets P are stopped. A configuration is employed with the present embodiment where measurement is performed when a pair of registration rollers 14 temporarily stop conveying the sheets P.

The surface property of the sheets P is detected as follows. That is, when light output from the light outputting element 32 is reflected on the sheet P, the light inputting element 33 receives this reflected light and converts the received light intensity into the voltage to output. The measurement result of sheet smoothness by the sheet surface property detector 30 based on the received light intensity is stored in the storing portion 17, and is used in paper dust removing performance determination processing by the CPU 16.

When smoothness is “high”, that is, when the sheet P is smooth, scattering light of the sheet P is little and therefore the received light intensity of the light inputting element 33 is great. By contrast with this, when smoothness is “low”, that is, when the sheet P is coarse and has significant concavities and convexities, scattering light of the sheet P is great and therefore the received light intensity of the light inputting element 33 is small.

As an index of smoothness, Bekk smoothness (unit: sec) is known. Bekk smoothness is about 30 to 200 in case of plain paper, about 200 to 2000 in case of gloss coated paper, and about 80 to 500 in case of matt coated paper and silk coated paper.

With the present embodiment, 200 of Bekk smoothness is used as a bifurcation value based on the result of study. That is, when Bekk smoothness is less than 200, smoothness of the sheet surface is low and therefore the influence on images due to paper dust is “small”, and, when Bekk smoothness is equal to or more than 200, smoothness of the sheet surface is high and therefore the influence on images due to paper dust is “great”.

When the sheet surface property detector 30 in FIG. 4 measures the sheet having Bekk smoothness: 200, the output voltage of the light inputting element 33 is set to 3 V (maximum output voltage: 5 V). When this output voltage is less than 3 V, sheet smoothness is “low” if Bekk smoothness is less than 200, and, when the output voltage is equal to or more than 3 V, sheet smoothness is “high” if Bekk smoothness is equal to or more than 200.

The flowchart according to the present embodiment is the same as in FIG. 3, and Table 5 is used for paper dust removing performance determination processing in step S2.

TABLE 5

Paper dust removing performance determination processing in S2

| | Amount of produced paper dust of sheet upon previous image formation | Sheet smoothness upon current image formation | Sheet basis weight upon current image formation | Paper dust removing performance |
|---|---|---|---|---|
| (1) | Great | High | Equal to or more than 106 g/m$^2$ | 5 |
| (2) | Great | High | Equal to or less than 105 g/m$^2$ | 4 |

TABLE 5-continued

Paper dust removing performance determination processing in S2

| | Amount of produced paper dust of sheet upon previous image formation | Sheet smoothness upon current image formation | Sheet basis weight upon current image formation | Paper dust removing performance |
|---|---|---|---|---|
| (3) | Great | Low | Equal to or more than 106 g/m$^2$ | 2 |
| (4) | Great | Low | Equal to or less than 105 g/m$^2$ | 1 |
| (5) | Small | High | Equal to or more than 106 g/m$^2$ | 4 |
| (6) | Small | High | Equal to or less than 105 g/m$^2$ | 3 |
| (7) | Small | Low | Equal to or more than 106 g/m$^2$ | 1 |
| (8) | Small | Low | Equal to or less than 105 g/m$^2$ | OFF |

Hereinafter, paper dust removing performance determination processing in step S2 in Table 5 will be described. That is, as illustrated in Table 5, sheet smoothness and sheet basis weight measured by the sheet surface property detector 30 are used for sheet information upon current image formation in step S2.

For example, in case of the following conditions A1 to A3, that is, in case of (1) in Table 5, a great amount of paper dust adheres to the sheet conveying path B and a pair of conveying rollers 13 due to plain paper upon previous image formation, and matt coated M1 paper upon current image formation is likely to splatter images due to small paper dust because of smoothness.

Further, the basis weight of matt coated M1 paper is great, and therefore the image splattering level is high.

A1. Sheets upon previous image formation are plain paper (the amount of produced paper dust: great), A2. Sheets upon current image formation are matt coated M1 paper and the detection result of the sheet surface property detector 30 is that smoothness is high (the output voltage of the light inputting element 33 is equal to or more than 3 V), and A3. The basis weight of matt coated M1 paper upon current image formation is equal to or more than 106 g/m$^2$ Consequently, by removing large paper dust and small paper dust on matt coated M1 paper with maximum performance of paper dust removing performance: 5, it is possible to reduce image deterioration such as white dots and image splattering due to paper dust on matt coated M1 paper upon current image formation.

In case of the following conditions B1 to B3, that is, in case of (2) in Table 5, a great amount of paper dust adheres to the sheet conveying path B and a pair of conveying rollers 13 due to plain paper upon previous image formation, and matt coated M2 paper upon current image formation is likely to splatter images due to small paper dust because of smoothness. Further, the basis weight of matt coated M2 paper is small, and therefore the image splattering level is slightly good.

B1. Sheets upon previous image formation are plain paper (the amount of produced paper dust: great), B2. Sheets upon current image formation are matt coated M2 paper and smoothness is high, and B3. The basis weight of matt coated M2 paper upon current image formation is equal to or less than 105 g/m$^2$ Consequently, by removing large paper dust and small paper dust on matt coated M2 paper with paper dust removing performance: 4 one level lower than the maximum performance, it is possible to reduce image deterioration such as white dots and image splattering due to paper dust on matt coated M2 paper upon current image formation.

In case of the following conditions C1 to C3, that is, in case of (3) in Table 5, a great amount of paper dust adheres to the sheet conveying path B and a pair of conveying rollers 13 due to plain paper upon previous image formation, and matt coated M3 paper upon current image formation is not likely to splatter images due to small paper dust because of smoothness. Further, the basis weight of matt coated M3 paper is great, and therefore the image splattering level is slightly high.

C1. Sheets upon previous image formation are plain paper (the amount of produced paper dust: great), C2. Sheets upon current image formation are matt coated M3 paper and smoothness is low (the output voltage of the light inputting element 33 is less than 3 V), and C3. The basis weight of matt coated M3 paper upon current image formation is equal to or more than 106 g/m$^2$ Consequently, by mainly removing large paper dust on matt coated M3 paper with paper dust removing performance: 2, it is possible to reduce image deterioration such as white dots and image splattering due to paper dust on matt coated M3 paper upon current image formation.

In case of the following conditions D1 to D3, that is, in case of (4) in Table 5, a great amount of paper dust adheres to the sheet conveying path B and a pair of conveying rollers 13 due to plain paper upon previous image formation, and matt coated M4 paper upon current image formation is not likely to splatter images due to small paper dust because of smoothness. Further, the basis weight of matt coated M4 paper is small, and therefore the image splattering level is good.

D1. Sheets upon previous image formation are plain paper (the amount of produced paper dust: great), D2. Sheets upon current image formation are matt coated M4 paper and smoothness is low, and D3. The basis weight of matt coated M4 paper upon current image formation is equal to or less than 105 g/m$^2$ Consequently, by mainly removing large paper dust on matt coated M4 paper with paper dust removing performance: 1, it is possible to reduce image deterioration such as white dots and image splattering due to paper dust on matt coated M4 paper upon current image formation.

In case of the following conditions E1 to E2, that is, in case of (5) in Table 5, paper dust does not adhere to the sheet conveying path B and a pair of conveying rollers 13 due to OHP resin sheets upon previous image formation. Therefore, although paper dust is little, matt coated M1 paper upon current image formation is likely to splatter images due to small paper dust because of smoothness, the basis weight of the matt coated M1 paper is great and therefore the image splattering level is high.

E1. Sheets upon previous image formation are OHP resin sheets (the amount of produced paper dust: small), E2. Sheets upon current image formation are matt coated M1 paper and smoothness is high, and E3. The basis weight of matt coated A paper upon current image formation is equal to or more than 106 g/m$^2$ Consequently, by removing large paper dust and small paper dust on matt coated M1 paper with paper dust removing performance: 4, it is possible to reduce image deterioration such as white dots and image splattering due to paper dust on matt coated M1 paper upon current image formation.

In case of the following conditions F1 to F2, that is, in case of (6) in Table 5, paper dust does not adhere to the sheet conveying path B and a pair of conveying rollers 13 due to OHP resin sheets upon previous image formation. Therefore, although paper dust is little, matt coated M2 paper upon current image formation is likely to splatter images due to small paper dust because of smoothness, and the basis weight of the matt coated M1 paper is small and therefore the image splattering level is slightly good.

F1. Sheets upon previous image formation are OHP resin sheets (the amount of produced paper dust: small), F2. Sheets upon current image formation are matt coated M2 paper and smoothness is high, and F3. The basis weight of matt coated M2 paper upon current image formation is equal to or less than 105 $g/m^2$ Consequently, by removing large paper dust and small paper dust on matt coated M2 paper with paper dust removing performance: 3, it is possible to reduce image deterioration such as white dots and image splattering due to paper dust on matt coated M2 paper upon current image formation.

In case of the following conditions G1 to G2, that is, in case of (7) in Table 5, paper dust does not adhere to the sheet conveying path B and a pair of conveying rollers 13 due to OHP resin sheets upon previous image formation. Hence, although paper dust is little and the matt coated M3 paper upon current image formation is not likely to splatter images due to small paper dust because of smoothness, the basis weight of the matt coated M3 paper is great and therefore the image splattering level is slightly high.

G1. Sheets upon previous image formation are OHP resin sheets (the amount of produced paper dust: small), G2. Sheets upon current image formation are matt coated M3 paper and smoothness is low, and G3. The basis weight of matt coated M3 paper upon current image formation is equal to or more than 106 $g/m^2$ Consequently, by mainly removing large paper dust on matt coated M3 paper with paper dust removing performance: 1, it is possible to reduce image deterioration such as white dots and image splattering due to paper dust on matt coated M3 paper upon current image formation.

In case of the following conditions H1 to H2, that is, in case of (8) in Table 5, paper dust does not adhere to the sheet conveying path B and a pair of conveying rollers 13 due to OHP resin sheets upon previous image formation. Hence, although paper dust is little and the matt coated M4 paper upon current image formation is not likely to splatter images due to small paper dust because of smoothness, the basis weight of the matt coated M4 paper is small and therefore the image splattering level is good.

H1. Sheets upon previous image formation are OHP resin sheets (the amount of produced paper dust: small), H2. Sheets upon current image formation are matt coated M4 paper and smoothness is low, and H3. The basis weight of matt coated M4 paper upon current image formation is equal to or less than 105 $g/m^2$ Consequently, even when paper dust removing performance is set to off, matt coated M4 paper upon current image formation is very little likely to cause image deterioration such as white dots and image splattering due to paper dust, and does not cause a problem in a practical use.

With the present embodiment, the operation portion 18 has been used as the sheet information determining portion. The type of sheet and basis weight of sheet information are determined by inputting the type of sheet and basis weight to the image forming apparatus from the operation portion 18 of the image forming apparatus 19 in FIG. 1 on which a copy button (not illustrated) is arranged.

Paper type of the type of sheet and basis weight are set in advance using the operation portion 18 for each one of the sheet cassettes 9, 9*a* and 9*b* in FIG. 1. The types of sheets include, for example, plain paper equal to or less than 105 $g/m^2$ and plain paper equal to or more than 106 $g/m^2$ as sheets which are likely to produce paper dust, and OHP resin sheet, gloss coated paper equal to or less than 105 $g/m^2$ and gloss coated paper equal to or more than 106 $g/m^2$ which are not likely to produce paper dust. More specifically, the sheet type and basis weight buttons such as "plain paper equal to or less than 105 $g/m^2$", "plain paper equal to or more than 106 $g/m^2$", "OHP sheet", "gloss coated paper equal to or less than 105 $g/m^2$" and "gloss coated paper equal to or more than 106 $g/m^2$" are selected on the screen of the operation portion 18 for each sheet cassette and set. Further, from which sheet cassette sheets upon previous image formation are fed and from which sheet cassette sheets upon current image formation are fed are stored in the storing portion 17, and the CPU 16 performs paper dust removing performance determination processing based on these pieces of information.

Further, the sheet surface property detector 30 has been used as the sheet information determining portion. Sheet smoothness of sheet information is determined by, for example, storing smoothness detected by the sheet surface property detector 30, in the storing portion 17 and performing paper dust removing performance determination processing in the CPU 16 based on these pieces of information as described above. If sheet smoothness is stored in the storing portion 17 for each of the sheet cassettes 9, 9*a* and 9*b* in FIG. 1, only smoothness of the first sheet needs to be measured by the sheet surface property detector 30 when the sheet cassettes are opened and closed, so that sheet smoothness needs not to be measured every image formation, which is preferable.

With the second embodiment, paper dust removing performance of the paper dust removing device 15 is adjusted using the type of sheet (plain paper and coated paper) and sheet basis weight as sheet information input in the image forming apparatus 19. However, with the present embodiment, paper dust removing performance of the paper dust removing device 15 is adjusted based on sheet information including sheet smoothness detected by the sheet surface property detector 30. Consequently, paper dust can be removed more adequately from sheets on which images are formed, so that it is possible to more accurately prevent image deterioration such as white dots and image splattering due to paper dust and, at the same time, prevent problems such as deterioration and a shorter-life of the paper dust removing device 15, an increase of power consumption and noise.

In addition, with the present embodiment, Bekk smoothness (sec) is bifurcated at 200 as an example. However, the image splattering level due to paper dust varies depending on a configuration of a transfer device of an image forming apparatus such as a transfer roller (contact type) or corona transfer (non-contact type), the diameter and hardness even in case of the transfer roller and a pressing force of the transfer roller. Consequently, the bifurcation value of smoothness may be randomly set according to the configuration of the transfer device.

Further, although a configuration has been described with the present embodiment where the sheet surface property detector 30 adopts a system of measuring a reflected light intensity of the sheet P to detect smoothness, other sheet surface property detectors may be used.

Further, particularly after a great amount of sheets such as plain paper which are likely to produce paper dust are fed, when sheets such as gloss coated paper which significantly influence images due to paper dust are fed, image deterioration is likely to occur due to paper dust. Hence, in addition to the type of sheet upon previous image formation, the number of sheets to feed upon previous image formation is stored in the storing portion 17 as sheet information. Further, according to the number of sheets to feed which are likely to produce paper dust upon previous image formation, when, for example, the number of sheets are 50 or more, performing fine adjustment of paper dust removing performance by increasing one level is more preferable.

Although embodiments of the present invention have been described above, numerical values and schematic views according to the first to third embodiments according to the present invention are examples for ease of description of the embodiments, and can be randomly set according to the configuration and setting of the image forming apparatus. Further, the present invention is by no means limited to the image forming apparatus described in the embodiments, and is also applicable to an image forming apparatus of another mode by combining each embodiment randomly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146194, filed Jun. 28, 2010, which is hereby incorporated by reference herein in its entirety.

What is claimed is:

1. An image forming apparatus comprising:

an image forming portion which forms an image on a sheet;

a paper dust removing device which is arranged on a sheet conveying path upstream of the image forming portion, and which is adjustable to adjust paper dust removing performance of removing paper dust on the sheet;

a storing portion which stores an amount of paper dust produced upon previous image formation according to a type of a sheet as previous paper dust production information and stores an amount of a deterioration of image due to paper dust according to a type of a sheet as image influence information; and a controlling portion which adjusts the paper dust removing performance of the paper dust removing device to remove dust from a sheet during current image formation, the adjustment based on the previous paper dust production information for the type of sheet in the current image formation stored in the storing portion and the image influence information for the type of sheet in the current image formation stored in the storing portion.

2. The image forming apparatus according to claim 1, wherein the storing portion further stores a basis weight of the sheet as sheet basis weight information, and the controlling portion adjusts the paper dust removing performance of the paper dust removing device to remove dust from the sheet during the current image formation referring to the previous paper dust production information for the type of sheet in the current image formation which is stored in the storing portion, the image influence information for the type of sheet in the current image formation which is stored in the storing portion and the sheet basis weight information for the type of sheet in the current image formation which is stored in the storing portion.

3. The image forming apparatus according to claim 1, further comprising a sheet surface property detector which detects smoothness of the sheet conveyed on the sheet conveying path, wherein the storing portion further stores a basis weight of the sheet as sheet basis weight information, and further stores a detection result of the sheet smoothness by the sheet surface property detector as sheet smoothness information, and the controlling portion adjusts the paper dust removing performance of the paper dust removing device to remove dust from the sheet during the current image formation referring to the previous paper dust production information for the type of sheet in the current image formation which is stored in the storing portion, the image influence information for the type of sheet in the current image formation which is stored in the storing portion, the sheet basis weight information for the type of sheet in the current image formation which is stored in the storing portion and the sheet smoothness information for the type of sheet in the current image formation which is stored in the storing portion.

4. The image forming apparatus according to claim 1, further comprising in a body of the image forming apparatus an inputting portion which inputs a sheet information related to the type of sheet upon the current image formation, wherein the controlling portion adjusts the paper dust removing performance by the paper dust removing device during current image formation based on the previous paper dust production information for the type of sheet input by the inputting portion and the image influence information for the type of sheet input by the inputting portion.

* * * * *